US010511639B2

(12) United States Patent
Pison et al.

(10) Patent No.: US 10,511,639 B2
(45) Date of Patent: Dec. 17, 2019

(54) STRUCTURE FOR INTEGRATING MOBILE SERVICES

(71) Applicant: AIRBUS DEFENCE AND SPACE SAS, Toulouse (FR)

(72) Inventors: Laurent Pison, Jouars Ponchartrain (FR); Olivier Paterour, Guyancourt (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 381 days.

(21) Appl. No.: 14/351,801

(22) PCT Filed: Oct. 15, 2012

(86) PCT No.: PCT/IB2012/002266
§ 371 (c)(1),
(2) Date: Apr. 14, 2014

(87) PCT Pub. No.: WO2013/054189
PCT Pub. Date: Apr. 18, 2013

(65) Prior Publication Data
US 2014/0241253 A1 Aug. 28, 2014

Related U.S. Application Data

(60) Provisional application No. 61/546,222, filed on Oct. 12, 2011.

(30) Foreign Application Priority Data

Aug. 24, 2012 (WO) ................. PCT/EP2012/003586

(51) Int. Cl.
*H04L 29/06* (2006.01)
*H04W 4/16* (2009.01)
(Continued)

(52) U.S. Cl.
CPC ...... *H04L 65/1016* (2013.01); *H04L 12/6418* (2013.01); *H04L 69/16* (2013.01);
(Continued)

(58) Field of Classification Search
CPC .......................... H04L 29/06; H04L 65/1016
(Continued)

(56) References Cited

U.S. PATENT DOCUMENTS

2007/0011195 A1* 1/2007 Kutsumi ................ G06Q 30/02
2007/0107047 A1 5/2007 Mukherjee et al.
(Continued)

FOREIGN PATENT DOCUMENTS

EP 2 259 658 12/2010

OTHER PUBLICATIONS ("Integration of Broadband Wireless Technologies and PMR Systems for Professional Communications", Durantini et al, Fourth International Conference on Networking and Services, yearly dated: 2008; pp. 84-89).*
(Continued)

*Primary Examiner* — Brandon M Renner
*Assistant Examiner* — Abdeltif Ajid
(74) *Attorney, Agent, or Firm* — Pillsbury Winthrop Shaw Pittman LLP (57) ABSTRACT

A structure for integrating mobile services, includes a top structure and a bottom structure, the top structure including: a device suitable for selecting, according to selection criteria, a service domain so as to determine whether a requested application, such as voice applications, SDS applications, or IP data applications, belongs to the domain of legacy services or IP service; a device capable of managing the various requests; and a device capable of providing APIs for the voice, SDS, and IP applications, the bottom structure including: a unit for IP routing towards the wireless network,
(Continued)

ensuring the IP routing of data to the suitable IP networks, configured so as to take into account the configuration of the network, the user profile, and the provision of QoS and security; and a unit for managing users, in particular in terms of user registration, deregistration, mobility and security, such as the use of the SSO.

5 Claims, 6 Drawing Sheets (51) Int. Cl.
*H04W 48/18* (2009.01)
*H04L 12/64* (2006.01)
*H04W 4/10* (2009.01)
*H04W 76/10* (2018.01)
*H04W 84/08* (2009.01)

(52) U.S. Cl.
CPC .............. *H04W 4/10* (2013.01); *H04W 4/16* (2013.01); *H04W 48/18* (2013.01); *H04W 76/10* (2018.02); *H04W 84/08* (2013.01)

(58) Field of Classification Search
USPC .......................................... 370/328
See application file for complete search history.

(56) References Cited

U.S. PATENT DOCUMENTS

2009/0239527 A1    9/2009  Forsten et al.
2011/0292841 A1*  12/2011  Sedlacek ........... H04W 36/0005
                                                             370/260
2012/0149421 A1*   6/2012  Korus .................... H04W 4/10
                                                              455/518

OTHER PUBLICATIONS

Durantini et al ("Integration of Broadband Wireless Technologies and PMR Systems for Professional Communications", Durantini et al, Fourth International Conference on Networking and Services, yearly dated: 2008; pp. 84-89).*

Durantini et al ("Integration of Broadband Wireless Technologies and PMR Systems for Professional Communications", Durantini et al, Fourth International Conference on Networking and Services, yearly dated: 2008; pp. 84-89). (Year: 2008).*

International Search Report as issued for International Application No. PCT/IB2012/002266, dated Mar. 21, 2013.

Written Opinion of the International Searching Authority as issued for International Application No. PCT/IB2012/002266, dated Mar. 21, 2013.

International Search Report as issued for International Application No. PCT/EP2012/003586, dated May 17, 2013.

Written Opinion of the International Searching Authority as issued for International Application No. PCT/EP2012/003586, dated May 17, 2013.

Durantini, et al., "Integration of Broadband Wireless Technologies and PMR Systems for Professional Communications," Fourth International Conference on Networking and Services, IEEE, 2008, pp. 84-89.

* cited by examiner

STRUCTURE FOR INTEGRATING MOBILE SERVICES

CROSS REFERENCE TO RELATED APPLICATIONS

This application is the U.S. National Stage of PCT/IB2012/002266, filed Oct. 15, 2012, which in turn claims priority to U.S. Patent Application No. 61/546,222, filed Oct. 12, 2011 and International Patent Application No, PCT/EP2012/003586 filed Aug. 24, 2014, the entire contents of all applications are incorporated herein by reference in their entireties.

FIELD OF THE INVENTION

The present invention relates to the field of structures for integrating mobile services. The invention is particularly advantageously applicable in the private systems of professional radiocommunication (i.e. PMR system, standing for Professional or Private Mobile Radio).

The object of this structure for integrating mobile services according to the invention is to provide applications with a set of advanced services such as optimized management and access to critical resources, such as the radio, in a transparent way for the different users of the applications.

STATE OF THE ART AND TECHNICAL PROBLEMS ENCOUNTERED

In the field of private digital systems of mobile radio-communication, hereinafter referred to as PMR system, there is a need to upgrade the PMR networks based on narrowband technologies, and coming from an outdated generation (or legacy), but being still used, into PMR networks based on broadband technologies. PMR networks based on narrowband means a TETRA or TETRAPOL or P25 technology network. PMR network based on broadband means an IP-WAN technology network. IP-WAN networks means networks based on WIFI (Wireless Fidelity) and/or WIMAX (Worldwide Interoperability for Microwave Access) and/or 2G ($2^{nd}$ generation of cellular network), and/or 3G ($3^{rd}$ generation of cellular network), and/or LTE (Long Term Evolution) technologies, and/or on a future technology.

The object of this evolution is to enable the integration of new services based on IP (Internet Protocol), but also to continue to support the services of PMR networks from previous generations, such as the radio as well as all the interfaces.

Narrowband and broadband networks, as well as their associated respective services, need to be systematically and efficiently managed to ensure that the services dedicated to critical missions can be supplied and further developed.

In the state of the art, there are systems for integrating telecommunication means such as IMS (IP Multimedia Services). Such an IMS system only provides the integration of IP services and does not take into account the management of non-IP networks, such as PMR legacy networks, with a strong focus on voice type services, and/or having a separation of the control plan and user plan while separately managing the control plan and the data plan.

However, such an IMS system does not allow an access control between the multiple applications used by a same user. This IMS system does neither allow a multi-user access to one or multiple IP networks with priority or load balancing functions. Moreover, the IMS system is above all oriented to allow the access of mobile users to application resources of the infrastructure for strongly heterogeneous international networks, but not to allow, for example, the management of a multi-user competitive access from one or several applications.

DISCLOSURE OF THE INVENTION

The object of the present invention is to resolve all the drawbacks of the state of the art. To do so, the invention provides a structure for integrating mobile services, according to any of the characteristics of claim 1 and of the following claims, enabling to ensure that the load capacity of each one of the networks will be taken into account, that priorities and access rights will be defined between the various users be enable the access to the various applications, that there will be access rights between the applications, the sessions, the users and the networks.

The invention enables a control of the access between the various applications used by a same user. The invention further enables a multi-user access to one or several IP networks with priority or load balancing functions. The invention also enables an access control to be ensured between several networks and especially the load balancing. The invention also enables the support of multicast/broadcast or of a mixture of unicast/multicast/broadcast networks, mainly due to the SIP protocol (Session Initialization Protocol), or any other signalling protocol over IP, even a proprietary protocol.

The invention generally enables to manage the specificities of various networks, whether the Quality of Service QoS, unicast/multicast/broadcast, as well as security strategies. The invention is capable to support any legacy service, provided that this service is already based on IP. Finally, the invention supports heterogeneous signalling protocols, especially via the addition of gateways.

The object of the invention is a structure for integrating mobile services, characterised by comprising a top structure and a bottom structure, said top structure including:
- means suitable for selecting, according to selection criteria, a service domain so as to determine whether a requested application, such as voice applications, SDS applications, or IP data applications, belongs to the domain of legacy services or IP service domain,
- means capable of managing the different requests, and
- means capable of providing APIs for the voice, SDS, and IP applications, said bottom structure including:
- a unit for IP routing towards the wireless network, ensuring an IP routing of data to the suitable IP networks, configured so as to take into account the configuration of the network, the user profile, and the provision of QoS and security,
- a unit for managing users, in particular in terms of user registration, user deregistration, mobility and security, such as the use of the SSO.

The object of the invention is also a network infrastructure including:
- a control room for managing a set of applications that can be accessed by the users,
- a service domain, especially for supporting the PTT legacy service,
- an access network encompassing the legacy networks, the public safety IP networks, the cellular IP network of the commercial type, the WLAN/LAN-IP networks, as well as wired networks, characterised by comprising a structure for integrating a mobile service, according to any of the preceding characteristics.

The invention further includes a terminal including:
- at least one modem, capable of connecting to at least one network, of the radio access network,
- a service domain including in a non-exhaustive way a PTT client, an SDS client as well as an RAL layer,
- an application layer including a set of applications, characterised by including a structure for integrating mobile services according to claim 1, capable of interacting with the structure of the network infrastructure.

The invention also relates to a method of operating an integration structure according to any of the preceding characteristics, characterised by including the following steps, when said terminal according to the invention has been registered by the structure according to the invention, via the available access networks:
- a step, where the structure receives a request from either an application server located in the control room, or an application client located in the terminal according to the invention,
- a step, where the structure according to the invention controls the access of this service for a recipient user provided beforehand with a terminal according to the invention,
- a step, where the structure according to the invention determines whether said user has a simultaneous access to several services, said structure carrying out a hierarchy of the use of the simultaneously operating services for a same user according to the priority level assigned to the applications,
- a step, where the structure according to the invention determines, for all the available IP networks, which one(s) are the most suitable to provide the requested service as a function, according to a non-exhaustive list, of the network load, of the unicast or broadcast configuration, or even of the load balancing between the IP networks,
- a step, where the structure according to the invention implements the service on the selected IP networks,
- a step, where the structure according to the invention initiates a session between the application requiring the service and towards the application for which the service is intended,
- a step, where the structure according to the invention enables the media streams to be ready to be sent by the source application towards the recipient application.

BRIEF DESCRIPTION OF THE FIGURES

The invention will be better understood upon reading the following description and upon studying the accompanying figures. The latter are only presented as an illustration, but in no way as a limitation of the invention. The figures show.

DESCRIPTION OF THE INVENTION

It should be now noted that the figures are not drawn to scale.

The following realizations are examples. Although the description refers to one or several embodiments, it does not necessarily mean that each reference relates to the same embodiment, or that the characteristics only apply to a single embodiment. Simple characteristics of various embodiments can also be combined in order to provide other realizations.

Figure 1A:
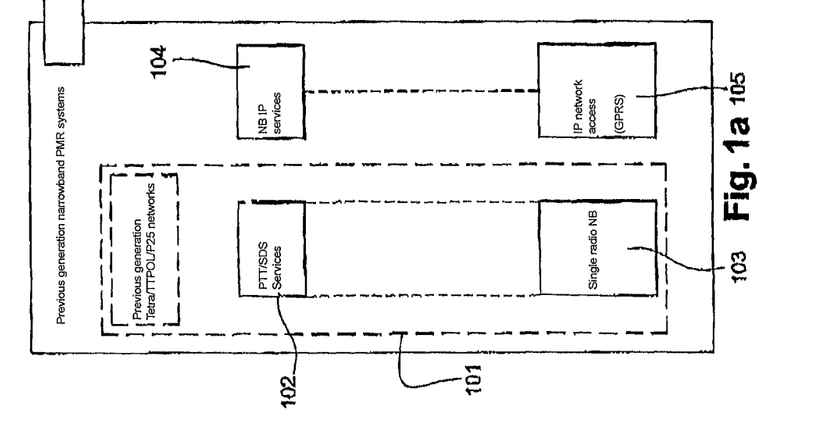
FIG. 1a: a schematic representation of the infrastructure of narrowband PMR systems, according to the state of the art.

FIG. 1a is an illustration of an infrastructure of narrowband PMR system called legacy system. Legacy PMR system should be understood in the rest of the description as a PMR system (Private Mobile Radio) based on a TETRA (TErrestrial Trunked RAdio) or TETRAPOL (TETRA POLice), or P25 (Project 25) technology. These technologies are called legacy technologies, in so far as they come from an outdated technological generation, but are still used. FIG. 1a therefore shows that a network infrastructure 101 based on a legacy PMR system comprises one or several PTT/SDS (Short Data Services) servers 102, capable of interfacing with a set of base stations 103 broadcasting a single narrowband radioelectrical signal. This infrastructure 101 especially enabling to manage radio resources, such as, for example, the base station BS, the mobile terminals or UE (User Equipment), the radio channels, etc., is totally linked and managed with PTT resources, such as users, group calls, etc.

On this FIG. 1a, it is noticed that the IP services are totally dissociated from the PTT services. Indeed, a server 104 provides narrowband IP services which are directly accessible from an IP access network 105 such as a GPRS (General Packet Radio Service) commercial network. However, few narrowband IP services can be directly used. There is therefore a need for an access to a broadband IP services.

Figure 1B:
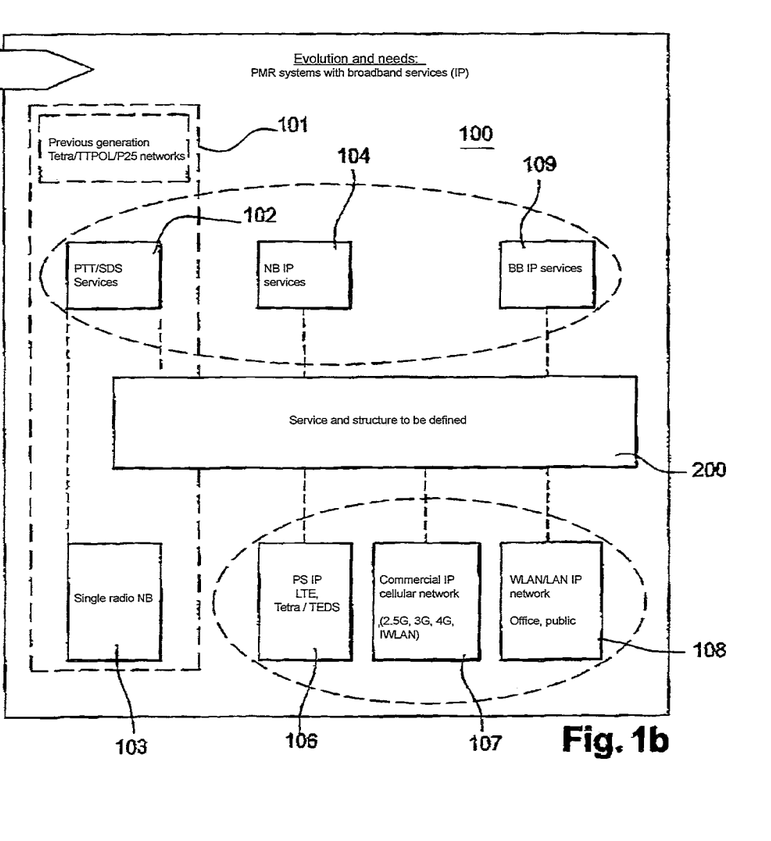
FIG. 1b: a schematic representation of the infrastructure of PMR systems with broadband IP services, according to an embodiment of the invention.

To do so, FIG. 1b illustrates such an evolution of the system presented in FIG. 1a, with the exception that it is compatible with the broadband IP services. Indeed, by means of public safety PS IP networks 106 based, for example, on a LTE (Long Term Evolution) solution, or an enhanced solution of TETRA for data services, still called TEDS (Tetra Enhanced Data Services), it is possible to access both narrowband NB IP services or broadband BB IP services 109. Further, the cellular IP networks 107 of the commercial type, such as 2.5G or 3G or 4G or WAN (Wide Area Network) networks, such as Wimax for example, as well as WLAN/LAN-IP networks 108, can also access independently of one another each one of these services.

However, in view of FIG. 1b, there are a certain number of constraints in order to make it simultaneously possible to:
- keep the PMR legacy services available, such as the voice service, or the SDS service, which are carried via the IP protocol, with or without SIP protocol (Session Initialization Protocol), with new IP services, which are NB (Narrow Band), and/or WB (Wide Band), and/or BB (Broad Band), which can also be based on the SIP protocol or not;
- provide heterogeneous access networks with the possibility to control the access thereto;

ensure a priority and a control between the multiple applications, based on the IP protocol or not, towards several networks, whether they are radio or non-radio networks. This includes the checking of the capacities of each network, unrelated to the application requests and to the number of present users. Each application can be unaware than the other applications are used by the users and the resources of the network;

ensure a priority and an access control to the streams of multiple applications and sessions for each user;

ensure a priority and an access control for a set or a group of users, especially by defining the role of each user;

ensure the access to users in a unicast or broadcast mode.

The invention offers to resolve all the previously cited constraints by setting up a structure 200 for integrating mobile services. This structure 200 according to the invention is more explicitly illustrated in FIG. 2. Thus, the structure 200 is located between a control room 110 and the access networks 120. The control room 110 enables the management of all the applications that can be accessed by the users via their respective terminals. In order to facilitate the understanding, access networks 120 encompass legacy networks 103 of the TetraPol, Tetra or P25 type, public safety IP networks 106 based, for example, on an LTE solution, or a TEDS solution, cellular IP networks 107 of a commercial type, such as the 2.5G (referenced 105) or 3G or 4G or IWLAN networks, as well as WLAN/LAN-IP networks 108. It should be noted that the wired networks (Gigabit Ethernet) can also be used for the connection of the network infrastructure 100 to the terminal 250.

Figure 2:
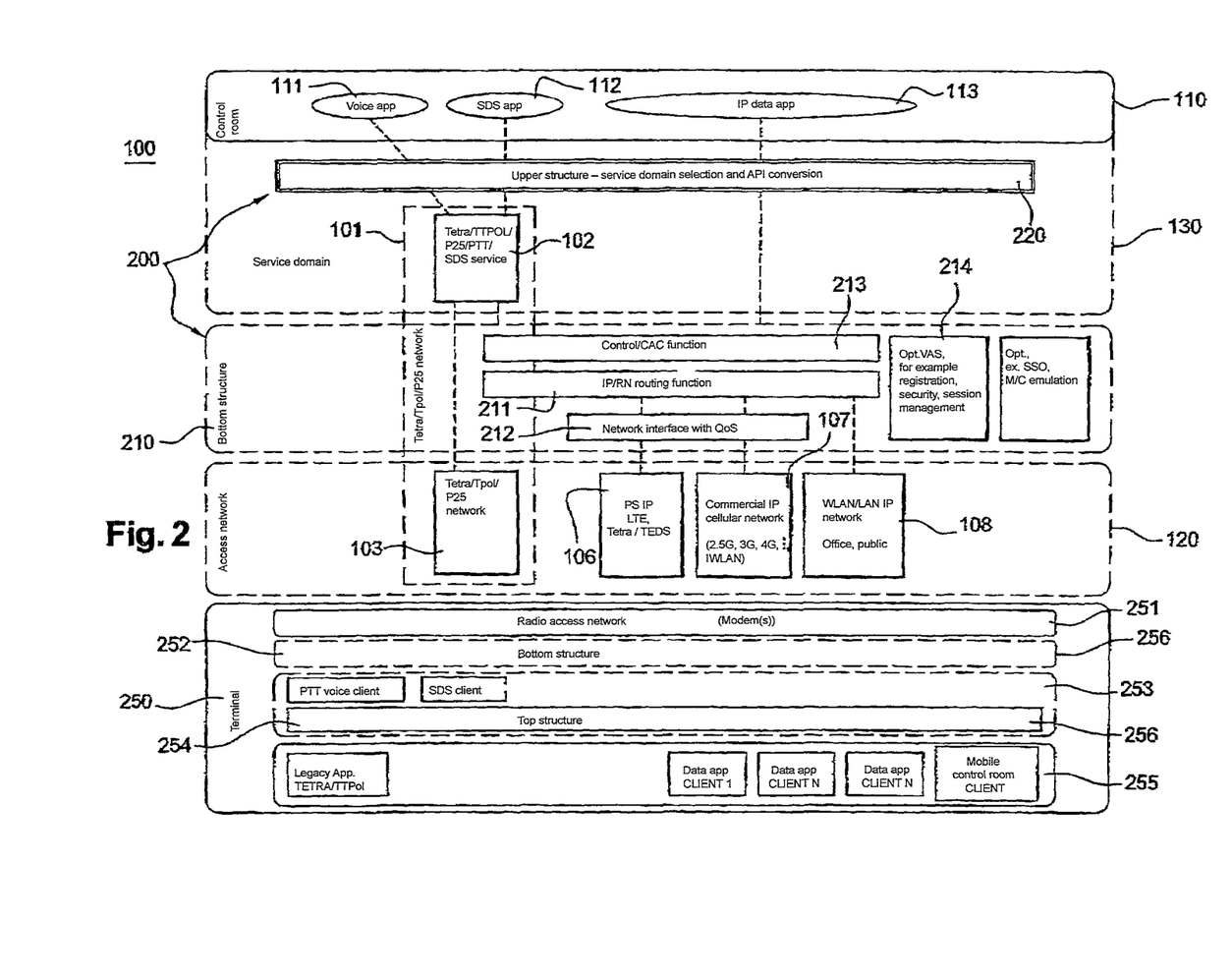
FIG. 2: a schematic representation of a mobile communication structure, according to an embodiment of the invention.

The structure 200 according to the invention provides an independent layer for the applications of the control room 110, in order to benefit from the available services and multiple access networks in a transparent way for the applications. This structure 200 also manages the access control, in terms of load capacity priority and Quality of Service, QoS, between multiple applications towards a user, between multiple users towards a network, etc.

However, this structure 200 is subdivided into a top structure 220 and a bottom structure 210. The top structure 220 is capable of selecting the service domain 130, in other words, of determining whether the requested application belongs to the domain of legacy services or IP service, and capable of managing the various requests. These applications can be dedicated to the voice, or to the short data services SDS, or to the IP data services. The top structure 220 includes means capable of providing APIs for the voice, SDS and IP applications. This structure 220 also includes means for ensuring a first selection of service domain according to selection criteria, which can be configured. The legacy service can be optionally added.

As far as the bottom structure 210 is concerned, it includes a unit for IP routing 211 towards the radio network ensuring to allow the global IP routing of data to the suitable IP networks, by taking into account the configuration of the network, the user profile, and the provision of QoS and security.

The structure 210 includes a network interface 212 which is dedicated to each radio network in order to manage the specificities, such as the QoS, security, etc. of each radio network once the latter has been chosen.

This bottom structure 210 not only supplies an suitable IP routing capacity for a given service for each user, but it also includes a functional control unit 213 which manages the access control and also provides an application control, among the various services and applications used by the user, since no control is carried out between the applications which work simultaneously, and by the applications themselves, since this is not their role.

A users handling unit for managing users 214, in particular in terms of user registration, deregistration, mobility, and security, such as the use of SSO (Single Sign On).

Un global control is performed among a list of multi-user services, in order to be sure that the priority services are still ensured.

Figure 5:
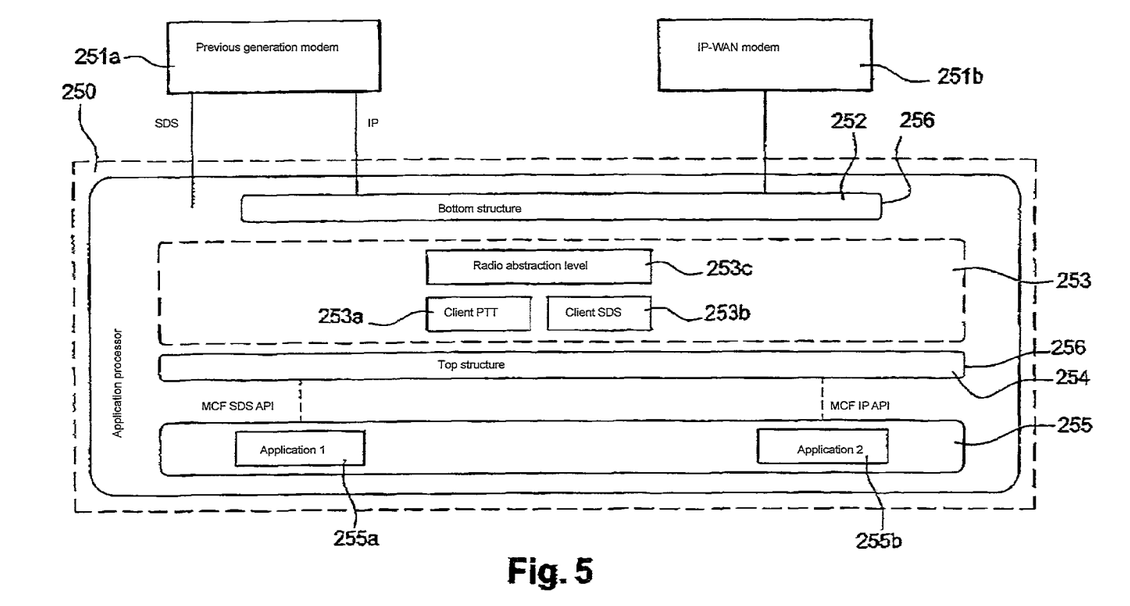
FIG. 5: a schematic representation of the terminal including a structure for integrating mobile services, according to an embodiment of the invention.

The terminal 250, illustrated in FIGS. 2 and 6, which was previously cited, will now be described in a little bit more detailed manner.

This terminal 250 includes one or several modem(s) 251, 251a, 251b, capable of connecting to at least one network 103, 106, 107, 108, of the radio access network 120, configured so as to be capable of connecting, if requested, simultaneously to several networks 103, 106, 107, 108.

Each modem is connected to a bottom structure 252 fulfilling the same functions as the previously cited bottom structure 210, with the exception that it does not include a functional control unit 213 especially managing the access control, nor a dedicated network interface 212 managing specificities, such as the QoS.

It should be noted that the structure 256 of the terminal 250 interacts with the structure 200 of the network infrastructure 100 for all the methods which will be later described and respectively referenced 310 and 320.

This bottom structure 252 is connected to a service domain 253 including in a non-exhaustive way a PTT client 253a, an SDS client 253b, as well as an RAL layer (Radio Abstraction Layer). The service domain 253 is connected to an top structure 254 entirely similar to the top structure 220 of the network infrastructure 100 except that it is solely dedicated to the resources and needs of the terminal 250. This top structure 254 is connected to an application layer 255 including a set of applications 255a, 255b.

In an alternative embodiment of the terminal 250 according to the invention, the latter is not a hand held terminal and acts as a router for a set of terminals. In such a case, the supported services and applications 255a, 255b are reduced since they are transferred in slave or dependant terminals (not represented). Consequently, the terminal 250 is capable of accommodating a set of terminals of the hand held type or not and supporting themselves a structure for integrating mobile services identical to the description made for the terminal 250. The possibility of this terminal 250 gives a significant advantage since the latter enables the presence of a single distribution point concerning access networks 120.

The method of operating the structure 200 according to the invention will now be explained in relation first to FIGS. 3a, 3b, then later to FIGS. 4a, 4b.

Figure 3A:
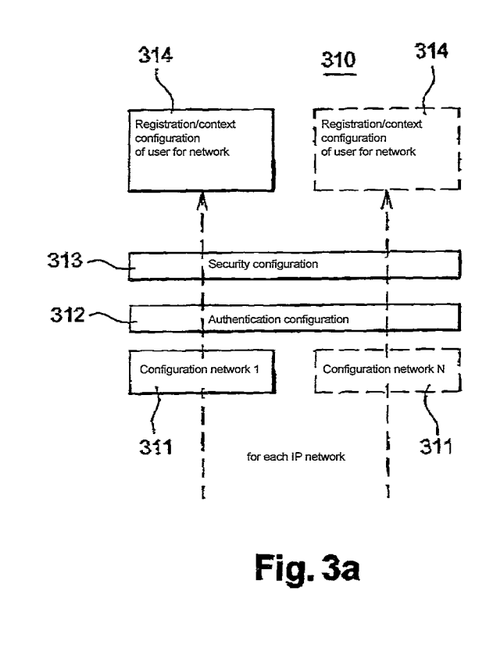
FIGS. 3a-3b: an illustration of a functional diagram of the operating method of the structure 200, according to an embodiment of the invention.
Figure 3B:
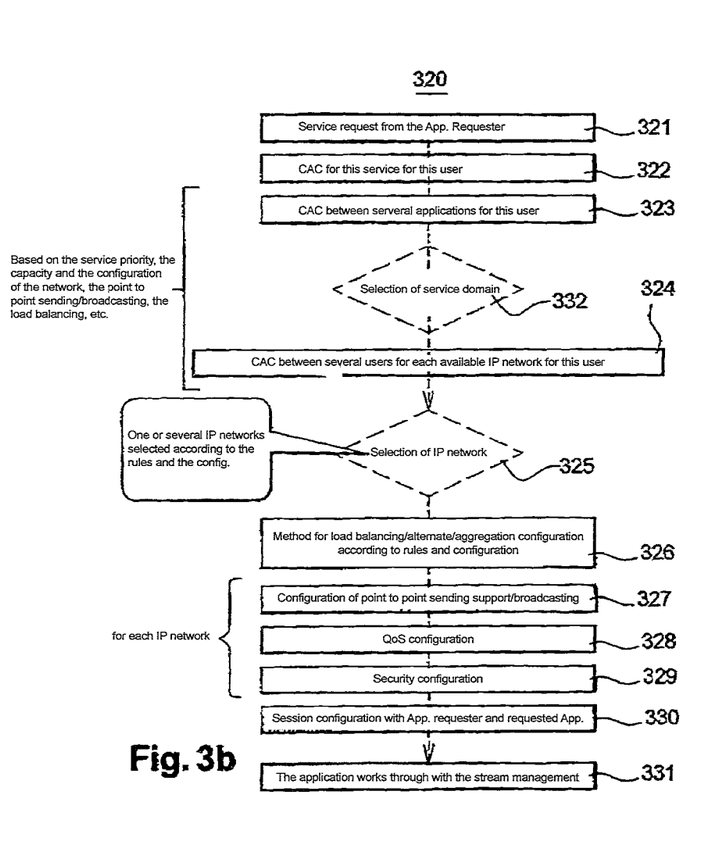

FIG. 3a illustrates an initialization method 310 of a client terminal 250 with respect to its user, said initialization method being repeated for each access network 120 to which a terminal 250 connects.

Thus, at a step 311, the terminal 250 initiates a connection to one or several networks 103, 106, 107, 108.

At a step 312, the terminal 250 proceeds to its authentication on the selected network(s) 103, 106, 107, 108.

At a step 313, the terminal 250 initiates, if necessary, the security parameters specific to its connection on the selected network 103, 106, 107, 108.

At a step 314, the terminal 250 is registered by the structure 200 via the available networks 103, 106, 107, 108.

When the terminal 250 is properly connected and registered to one or several network(s) according to the method 310, then a method 320 of treating the service requests emitted by the applications is carried out.

Thus, at a step 321, the bottom structure 200 receives a request coming from either the application server (not represented) located in the control room 110, or from the application client located in the terminal 250. When the structure 200 or 256 has detected a request coming from a service of the source application, it then carries out a step 322. All the steps subsequent to 322 are either directly managed by the structure 200, in the case of a service requested from an application server, or between the structures 256 and 200, in the case of a service requested from the terminal 250.

At the step 322, the structure 200, 256 controls the access to this service for a recipient user provided beforehand with a terminal 250.

At a step 323, the structure 200, 256, determines whether said user simultaneously accesses several services. The structure 200, 256 carries out a hierarchy of the use of the simultaneously operating services for a same user according to the priority level assigned to the applications.

At a step 332, the structure 250, 256, selects a service domain for the requested service. This step 332 can be optional.

At a step 324, the structure 200, 256 determines for all the available networks, which one(s) are the most suitable to provide the requested service as a function, according to a non-exhaustive list, of the network load, of the unicast or broadcast configuration, or even of a load balancing between the networks 106, 107, 108. To do so, the structure 200, 256 carries out, as in step 323, a hierarchy of the use of the simultaneously operating services for a same user according to a non-exhaustive list of criteria which is specific to each manager of a radio communication private system, such as the priority level assigned to the respective data circulating through the services, the capacity or the load of the access network 120 followed by each service, the unicast or broadcast configuration, or even the load balancing between the access networks 120.

At a step 325, the structure 200, 256 implements the service on the selected networks 106, 107, 108.

At a step 326, the structure 200, 256 optionally carries out, and if several networks are chosen to provide the service, either a load balancing between the access networks 120, or an alternate mode of the use of used networks among the access networks 120, or a method aggregation depending on several rules and configurations of said networks.

At a step 327, the structure 200, 256 initializes, for each IP network 106, 107, 108, a unicast or broadcast carrier according, for example, to the number of present users in a determined area.

At a step 328, the structure 200, 256 optionally sets up, if the QoS is available, for each IP network 106, 107, 108, an adapted quality of service QoS.

At a step 329, the structure 200, 256 sets up, for each IP network 106, 107, 108, an adapted security strategy.

At a step 330, the structure 200, 256 initiates the session between the application requiring the service and towards the application for which the service is intended.

At a step 331, the structure 200, 256 enables the media streams to be ready to be sent by the source application towards the recipient application.

It should be noted that the steps 326 to 329 can be individually optional and that this sequence of steps can be modified, according to the desired implementation.

Figure 4A:
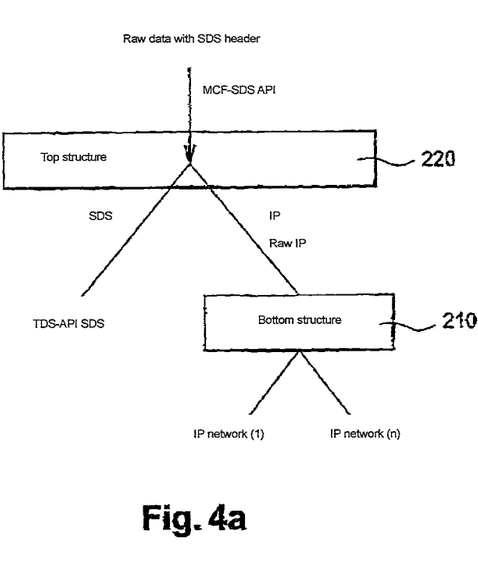
FIGS. 4a-4c: schematic representations of the implementation of the method according to the FIGS. 3a and 3b, according to an embodiment of the invention.
Figure 4B:
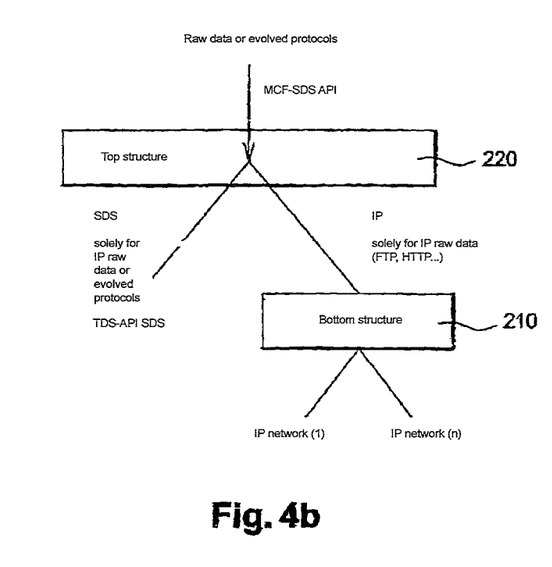
Figure 4C:
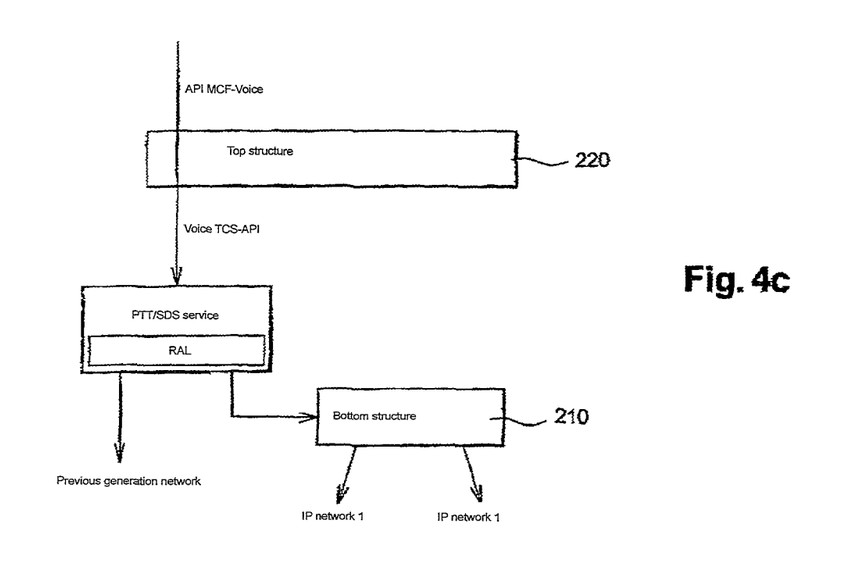

The method 320 will now be implemented on two embodiments, respectively illustrated in FIGS. 4a, 4b and 4c.

It should be noted that the descriptions made below are described in the case of a routing of the application server towards the application client in the terminal 250 (not represented in FIGS. 4a, 4b, and 4c), but can be identically applied from the application client in the terminal 250 towards the application servers.

In a first embodiment, illustrated in FIG. 4a, a short data service SDS transmits a raw datum towards a terminal 250. Through an interface between the structure 200 and the application server, the top structure 220 selects the IP network provided that the user is registered on the IP network and that said IP network is preferred to a legacy network by configuration. Otherwise, the structure 220 determines whether the SDS application requires a passage through an IP network. If the SDS application does not require a passage through the IP network, then the bottom structure 210 becomes transparent, and the SDS application uses a TCS (Tetra Connectivity Server) type interface in order to reach the suitable legacy network infrastructure.

In a second embodiment, illustrated in FIG. 4b, a raw IP datum must reach a terminal 250. Through an interface between the structure 200 and the application server, the top structure 220 selects the IP network provided that the user is registered on the IP network and that said IP network is preferred to a legacy network by configuration. Otherwise, the structure 220 will select the legacy network. If, on the contrary, the IP datum is from the evolved IP protocol such as http (Hyper Text Transfer Protocol) for example, then the structure 210 supports this IP datum. Thus, according to FIG. 4b, this datum being of the IP type, then the bottom structure 210 selects the suitable IP access network 106, 107, 108, according to the priority level assigned to the datum, to the capacity or to a load of access networks 106, 107, 108, to the unicast or broadcast configuration, or even to the load balancing between said networks.

In a third embodiment, illustrated in FIG. 4c, a PTT voice service must reach a terminal 250. Through an interface between the structure 200 and the application server, the top structure 220 selects the IP network provided that the user is registered on the IP network and that said IP network is preferred to a legacy network by configuration. Otherwise, the structure 220 will select the legacy network. Thus, the structure 220 determines whether the voice service requires a passage through an IP network or not. If the voice service does not require a passage through the IP network, then the bottom structure 210 becomes transparent, and the voice service uses a TCS (Tetra Connectivity Server) type interface in order to reach the suitable legacy network infrastructure. However, according to the priority level assigned to the voice service, of the capacity or to the load of the access networks 103, 106, 107, 108, to the unicast or broadcast configuration, or even to the load balancing between said networks, the RAL (Radio Abstraction Layer) introduces the IP network as a support for the legacy network. Since the voice service becomes IP, then the bottom structure 210 selects the suitable IP access network 106, 107, 108.

The invention claimed is:

1. A method comprising, for each access network of a plurality of available networks to which a terminal connects:
   a step, where the terminal initiates a connection to one of the plurality of available networks;
   a step, where the terminal proceeds to its authentication to said one of the plurality of available networks;
   a step, where the terminal initiates security parameters for the connection to said one of the plurality of available networks;

a step, where the terminal is registered by a structure for integrating mobile services via the plurality of available networks, and wherein a treatment of service requests received by an application server and emitted by applications of terminals is managed by a control room, the control room being connected to said structure for integrating mobile services, said treatment of service requests comprising for each request of service received from a recipient application of a terminal towards a source application:

a step, where the structure for integrating mobile services receives a request of service from the application server, a step, where the structure for integrating mobile services controls access of said service for a recipient user provided with the terminal, a step, where the structure for integrating mobile services determines whether said user simultaneously accesses to several simultaneously operating services, said structure for integrating mobile services carrying out a hierarchy depending on a priority level assigned to each service for using the simultaneously operating services for said same user according to the priority levels assigned to the applications, a step, where the structure for integrating mobile services determines for all the available networks, which one(s) is/are the most suitable to provide the requested service as a function of at least a network load, of a unicast or broadcast configuration, and of the load balancing between the networks, a step, where the structure for integrating mobile services implements the service on the selected network(s), a step, where the structure for integrating mobile services initiates a session between the source application towards the recipient application on the user terminal for which the service is intended, a step, where the structure for integrating mobile services enables media streams to be ready to be sent by the source application towards the recipient application.

2. The method according to claim 1, comprising a step, where the structure for integrating mobile services selects a service domain for the requested service among:
   private digital systems of mobile radio communication based on narrowband technologies, and
   private digital systems of mobile radio communication based on broadband technologies.

3. The method according to claim 1, comprising a step, if several networks are chosen to provide the service, where the structure for integrating mobile services carries out either a load balancing between the access networks, or an alternate mode of the use of the networks used among the access networks, or a method aggregation depending on several rules and configurations of said networks.

4. The method according to claim 1, comprising a step, where the structure for integrating mobile services initiates, for each IP network, a unicast or broadcast carrier according to the number of users present in a determined area.

5. The method according to claim 1, wherein the structure for integrating mobile services comprises a unit for IP routing to allow IP routing of data to suitable IP networks, by taking into account the configuration of the network, a user profile, and a provision of quality of service (QoS) and security, the method comprising:
   a step, where the structure for integrating mobile services sets up, for each IP network, an adapted quality of service QoS, and
   a step, where the structure for integrating mobile services sets up, for each IP network, an adapted security strategy.

* * * * *